United States Patent
Graham et al.

(10) Patent No.: US 10,048,987 B1
(45) Date of Patent: Aug. 14, 2018

(54) METHODS AND APPARATUS FOR A RESOURCE SHARING PLATFORM HAVING RESOURCE QUALITY ESTIMATION

(71) Applicant: EMC CORPORATION, Hopkinton, MA (US)

(72) Inventors: Stephen G. Graham, Chapel Hill, NC (US); Eric Gelinas, Montreal (CA); Frederic Meunier, Montreal (CA); Alexandre Lemay, Deux-Montagnes (CA); Raphaël Aubert, Montreal (CA); Salvatore DeSimone, Woodbury, CT (US); Dominique Prunier, Montreal (CA)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 83 days.

(21) Appl. No.: 14/976,332

(22) Filed: Dec. 21, 2015

(51) Int. Cl.
G06F 9/46 (2006.01)
G06F 9/455 (2018.01)
G06F 9/50 (2006.01)
G06F 9/48 (2006.01)

(52) U.S. Cl.
CPC .......... G06F 9/5011 (2013.01); G06F 9/4881 (2013.01)

(58) Field of Classification Search
None
See application file for complete search history.

(56) References Cited

U.S. PATENT DOCUMENTS

| | | | | |
|---|---|---|---|---|
| 8,051,324 B1* | 11/2011 | Zhao | ................ | G06F 11/3409 700/3 |
| 2012/0131591 A1* | 5/2012 | Moorthi | ................ | G06Q 10/06 718/104 |
| 2013/0031561 A1* | 1/2013 | Balmin | ................ | G06F 9/5077 718/104 |
| 2013/0124145 A1* | 5/2013 | Yatko | ................ | G06F 9/5044 702/186 |
| 2015/0035939 A1* | 2/2015 | Hillier | ................ | H04L 12/1822 348/14.08 |
| 2015/0326491 A1* | 11/2015 | Baumback | ............ | G06F 9/5061 709/226 |
| 2016/0232468 A1* | 8/2016 | Meiri | ................ | G06Q 10/087 |
| 2016/0295566 A1* | 10/2016 | Morper | ................ | H04W 72/04 |
| 2017/0168729 A1* | 6/2017 | Faulkner | ............... | G06F 3/0613 |

OTHER PUBLICATIONS

EMC® ViPR® Controller, Version 2.2.0, Concepts Articles, 302-001-889, Published Mar., 2015, 66 pages.
Hindman et al.; "Mesos: A Platform for Fine-Grained Resource Sharing in the Data Center", Sep. 30, 2010, University of California Berkeley, 14 pages.

* cited by examiner

*Primary Examiner* — Bradley Teets
(74) *Attorney, Agent, or Firm* — Daly, Crowley, Mofford & Durkee, LLP (57) ABSTRACT

Methods and apparatus for providing resource quality estimation in a resource sharing platform having a master and resources on slaves. Embodiments include storing resource performance data for the resources and estimating resource performance using the stored performance data. A framework can use the estimated resource performance data to select between a first resource offer and a second resource offer, which can be equivalent.

5 Claims, 6 Drawing Sheets

METHODS AND APPARATUS FOR A RESOURCE SHARING PLATFORM HAVING RESOURCE QUALITY ESTIMATION

BACKGROUND

Conventional resource sharing platforms allow frameworks, e.g., applications, to choose to accept or decline resource offers made by a master based on available resources in slaves. If a framework accepts a resource offer, those resources are given to that framework for some period of time. The framework scheduler then assigns workload in the form of tasks to be run on a slave for the accepted offer. When the tasks are completed, the freed up resources are returned so they can be offered to other frameworks.

One difficulty in building a framework in conventional resource sharing platforms is creating logic to determine which resource offers to accept and which offers to decline. For example, an offer may be suitable for present framework needs, but a better resource offer may be coming soon, such as within a few seconds. Perhaps the present offer is as good an offer as the framework can expect to receive for some time. In general, a conventional framework cannot predict whether better resource offers will be received.

Furthermore, in conventional resource sharing platforms the framework has no idea on the quality of the resource offer. Even with the resource partitioning of Linux cGroups, for example a slice of a CPU on a lightly loaded slave machine might have better expected throughput than a slice of a CPU on a slave machine running many tasks. The throughput of disk I/O on one slave machine may be much better than can be expected on a different slave machine. Conventional frameworks lack suitable logic for choosing between an offer from one slave machine and an equivalent offer from another slave machine. Furthermore, information changes over time as workload increases and decreases across the collection of slave machines in the cluster.

SUMMARY

In some embodiments, methods and apparatus provide a resource sharing system having resource quality estimation to evaluate resource offers. In embodiments, the performance of resources on slave machines performing tasks under the control of master is measured. In one or more embodiments, frameworks supported by the resource sharing platform can query a performance service to determine historical trends and recent performance estimates for slave machine(s) to form an estimate of expected performance of a resource offer from that slave machine(s). Using this information, frameworks can make informed choices when presented with multiple resource offers which may appear to be equivalent.

In one aspect of the invention, a method comprises: storing resource performance data for resources provided by slaves in a resource sharing platform having a master and the slaves, wherein the resources include CPU time and free memory; estimating resource performance according to the stored performance data; selecting, by a framework communicatively coupled to the master and the slaves, between a first resource offer and a second resource offer according to the estimated resource performance, wherein the first and second resource offers include available resources on the slaves.

In certain embodiments, a method can include one or more of the following features: the first and second offers are substantially equivalent, augmenting the first and second resource offers with the resource performance data, augmenting the first and second resource offers with the resource performance data prior to sending the offers to the master, augmenting, by the master, the first and second offers with the resource performance data, evaluating the first and second offers; allocating, by the master, the resources on the slaves; and assigning, by the slaves, tasks for the resources on the slaves, estimating resource quality; a first one of the slaves includes a performance estimator task, and a second one of the slaves includes a performance estimator application, enabling a further framework access to the performance estimator application, and/or the master selects a framework from a plurality of frameworks to send a resource offer based on the resource performance data.

In another aspect of the invention, an article comprises: a non-transitory computer readable medium having stored instructions that enable a machine to: store resource performance data for resources provided by slaves in a resource sharing platform having a master and the slaves, wherein the resources include CPU time and free memory; estimate resource performance according to the stored performance data; and select, by a framework communicatively coupled to the master and the slaves, between a first resource offer and a second resource offer according to the estimated resource performance, wherein the first and second resource offers include available resources on the slaves.

In certain embodiments, an article can include instructions for one or more of the following features: the first and second offers are substantially equivalent, augmenting the first and second resource offers with the resource performance data, augmenting the first and second resource offers with the resource performance data prior to sending the offers to the master, augmenting, by the master, the first and second offers with the resource performance data, evaluating the first and second offers; allocating, by the master, the resources on the slaves; and assigning, by the slaves, tasks for the resources on the slaves, estimating resource quality; a first one of the slaves includes a performance estimator task, and a second one of the slaves includes a performance estimator application, enabling a further framework access to the performance estimator application, and/or the master selects a framework from a plurality of frameworks to send a resource offer based on the resource performance data.

In a further aspect of the invention, a resource sharing system, comprises: slaves having a plurality of processing resources; a master coupled to the slaves to receive offers of the slave processing resources; a framework coupled to the master to receive and accept resources offers from the master, which tasks the slave processing resources for the accepted resource offers; a module to estimate resource performance of the slave processing resources using stored performance data and use the estimated resource performance by the framework coupled to the master and the slaves to select between a first resource offer and a second resource offer, wherein the first and second resource offers include available resources on the slaves.

In certain embodiments, a system can include one or more of the following features: the first and second offers are substantially equivalent, augmenting the first and second resource offers with the resource performance data, the framework includes a scheduler to evaluate the first and second offers, the master includes an allocation module to allocate the resources, and the slaves include respective executor modules to assign tasks for the resources on the slaves, the framework includes a resource quality estimator, a first one of the slaves includes a performance estimator task, and a second one of the slaves includes a performance estimator application, enabling a further framework access to the performance estimator application, augmenting the first and second resource offers with the resource performance data prior to sending the offers to the master, the master augments the first and second offers with the resource performance data, and/or the master selects a framework from a plurality of frameworks to send a resource offer based on the resource performance data.

BRIEF DESCRIPTION OF THE DRAWINGS

The foregoing features of this invention, as well as the invention itself, may be more fully understood from the following description of the drawings in which.

DETAILED DESCRIPTION

Figure 1:
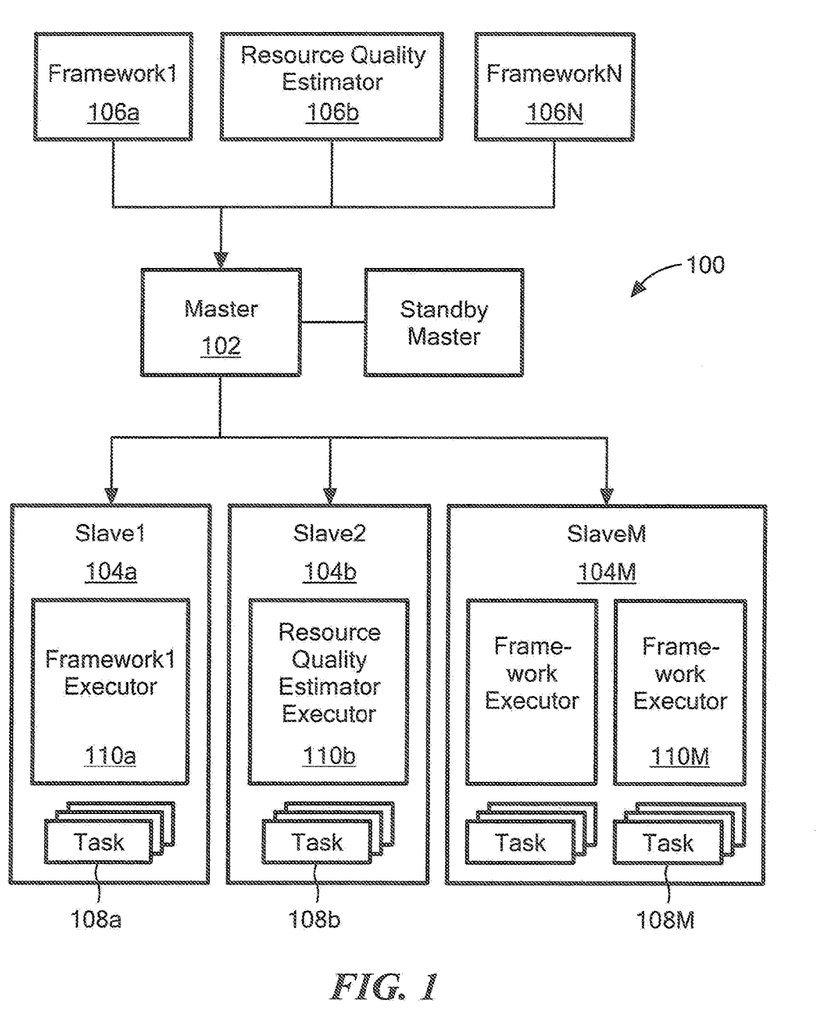
FIG. 1 is a schematic representation of a system including a resource sharing platform having resource quality estimation in accordance with illustrative embodiments of the disclosure.

FIG. 1 shows an illustrative system 100 having resource quality estimation in accordance with embodiments of the invention. The system 100 includes a master process 102 that manages slave daemons 104a-M running on each cluster node, and frameworks 106a-N that run tasks 108a-M on the respective slaves. In illustrative embodiments, the system 100 includes a resource quality estimator framework 106b, as described more fully below.

The slaves 104 provide various resources such as CPU, memory, network ports, disk storage, etc., that can be allocated to various computing tasks. In embodiments, servers can be considered slaves. The master 102 accumulates resource offers from the slaves 104 within a cluster and makes resource offers to frameworks 106 running on that cluster. The master 102 implements resource sharing across frameworks using resource offers that contain a list of free resources on one or more slaves 104. The master 102 determines how many resources to offer to each framework 106 according to a given policy, such as fair sharing, strict priority, and the like.

The frameworks 106 include a scheduler that registers with the master 102 to be offered resources, and an executor process 110a-M that is launched on slave nodes 104 to run the framework tasks. While the master 102 determines how many resources are offered to each framework 106, the framework schedulers select which of the offered resources to use. When a framework 106 accepts offered resources, it passes a description of the tasks 108 it wants to run. In turn, tasks 108 are launched on the corresponding slaves 104.

Figure 2:
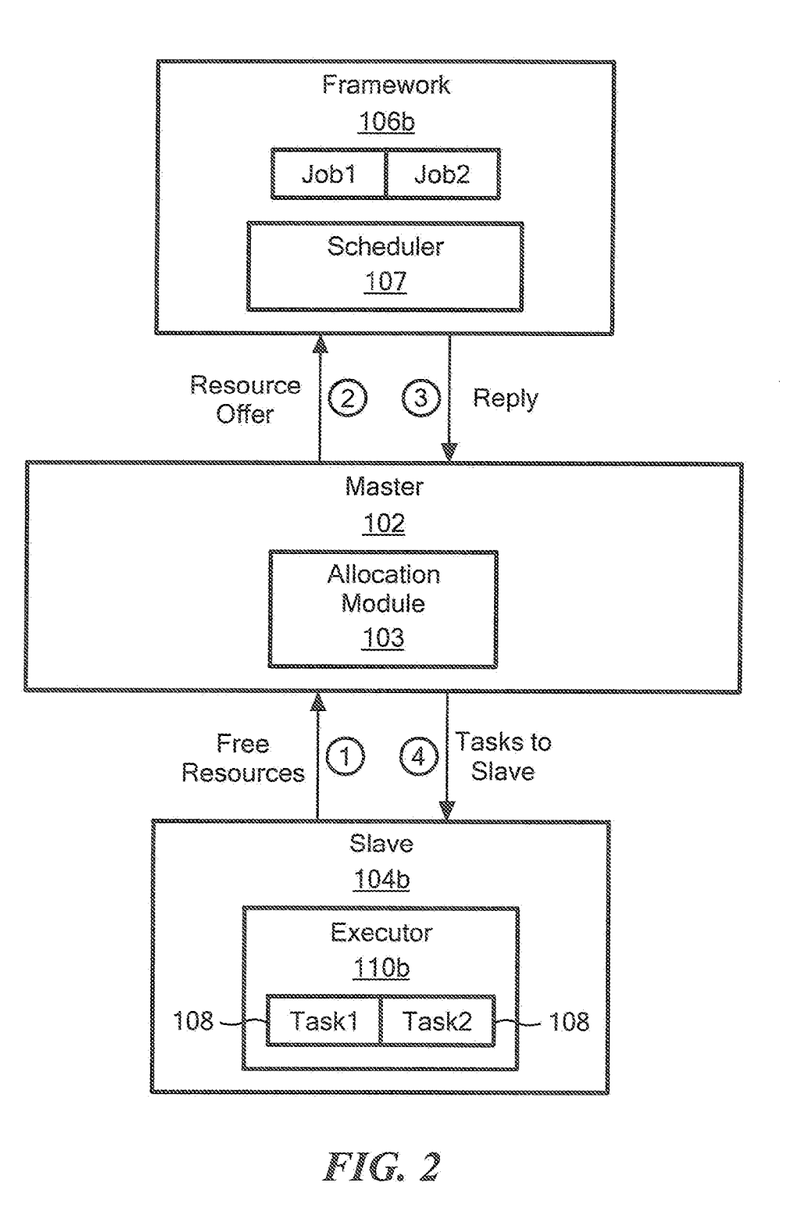
FIG. 2 is a schematic representation showing further detail of the resource quality estimation of FIG. 1 in accordance with illustrative embodiments of the disclosure.

FIG. 2 shows an example of how a framework, such as the resource quality estimator 106b, is scheduled to run a task. First (1), slave 104b reports to the master 102 a list of available resources, such as CPU time and free memory. The master 102 then invokes the allocation policy module 103, which determines, for example, that the framework 106b should be offered all of the available resources. It is understood that any practical portion of the offered resources can be allocated to one or more frameworks. Second (2), the master 102 sends a resource offer to the framework 106b describing the available resources on the slave(s) 104b for use by the framework. Third (3), the framework scheduler 107 replies to the master 102 with information about two tasks 108, for example, to run on the slave. Some of the resources are used for the first task and the remaining resources are used for the second task. Fourth (4), the master 102 sends the tasks to the slave 104b, which allocates appropriate resources to the framework executor 110b, which in turn launches the two tasks 108. In general, this resource offer process repeats when tasks finish and new resources become free.

In general, frameworks 106 have the ability to reject offers from the master. A framework can reject the offers that do not satisfy certain constraints and accept the ones that do. The system delegates allocation decisions to the allocation module 103 in the master 102, so that organizations can customize allocations to meet particular needs. In normal operation, since most tasks are short, resources are only reallocated when tasks finish. This usually happens frequently enough so that new frameworks acquire resources quickly.

Figure 3:
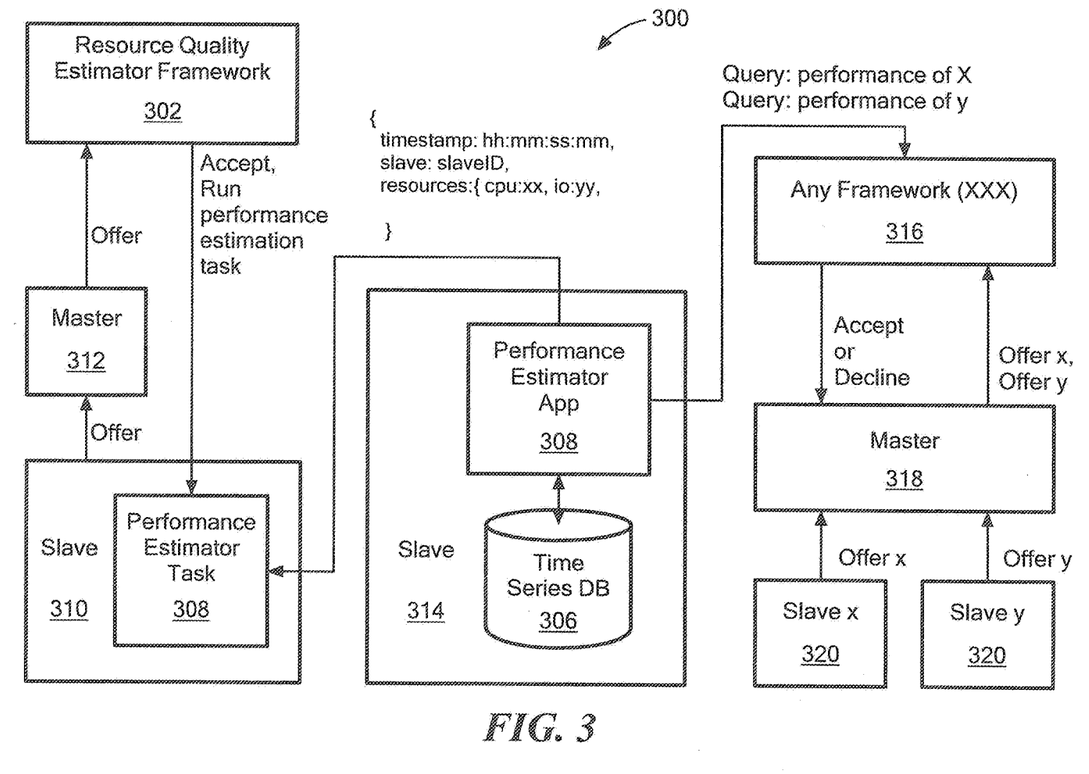
FIG. 3 is a schematic representation showing further detail of the resource quality estimation of FIGS. 1 and 2 in accordance with illustrative embodiments of the disclosure.

FIG. 3 shows a system 300 having a resource quality estimator framework 302 having a first task as a permanent performance estimator application 304, which provides a REST API to a time series database 306 to store the performance information about the slaves in the cluster, and a second task as a performance estimator task 308, which is a short running (ephemeral) task that gathers performance (quality) metrics about the resources on a slave 310, such as current I/O throughput, latency etc. An example metrics collector includes EMC Monitoring and Reporting Platform.

A master 312 receives available resource information from the slave 310 that can be used by the resource quality estimator framework 302 via the performance estimator task 308. The performance estimator application 304 and time series database 306 can be executed by a further slave 314. Other frameworks 316 can be coupled to other masters 318 and slaves 320 that can exchange resource offers. The other framework(s) 316 can be coupled to the performance estimator application 304 to evaluate resource offer information.

The resource quality estimator framework 302 listens for resource offers from the master 312 and periodically determines that updated quality metrics for the resources on a given slave should be obtained. These metrics are gathered by accepting the resource offer from the slave 310, running a short lived probe as a task on that slave 310. The gathered metrics include information on how well the given set of resources on the slave 310 are performing at the current time, e.g., under the current workload aggregated across the cluster. The REST API on the performance estimator application 304 is used to record this time series information and store it in the time series database 306. The task should run quickly so that the resources are freed up and offered to other frameworks 316 running in the cluster. Over time, as many resource offers from the slaves in the cluster are accepted in this fashion, the time series database 306 in the performance estimator application 304 obtains a good record of historical and current performance of the resources from the slaves in the cluster.

In general, frameworks 316 can include logic to exploit the performance information about the cluster and compare the resource offer from slaves 320 (shown as slave x and slave y), for example, in the cluster by querying the REST API provided by the performance estimator application 304. The query can return current and/or historical information about how well the resources have performed from that slave. The framework 316 can use that information to make an application-specific choice on which of the two offers (offer x, offer y) is better, for example.

In embodiments, the information stored in the performance estimator application 304 is augmented with resource usage metrics gathered from monitoring the operation of long running tasks running on the slave nodes. Such metrics can provide additional information regarding expected future resource consumption on the slave.

Figure 4:
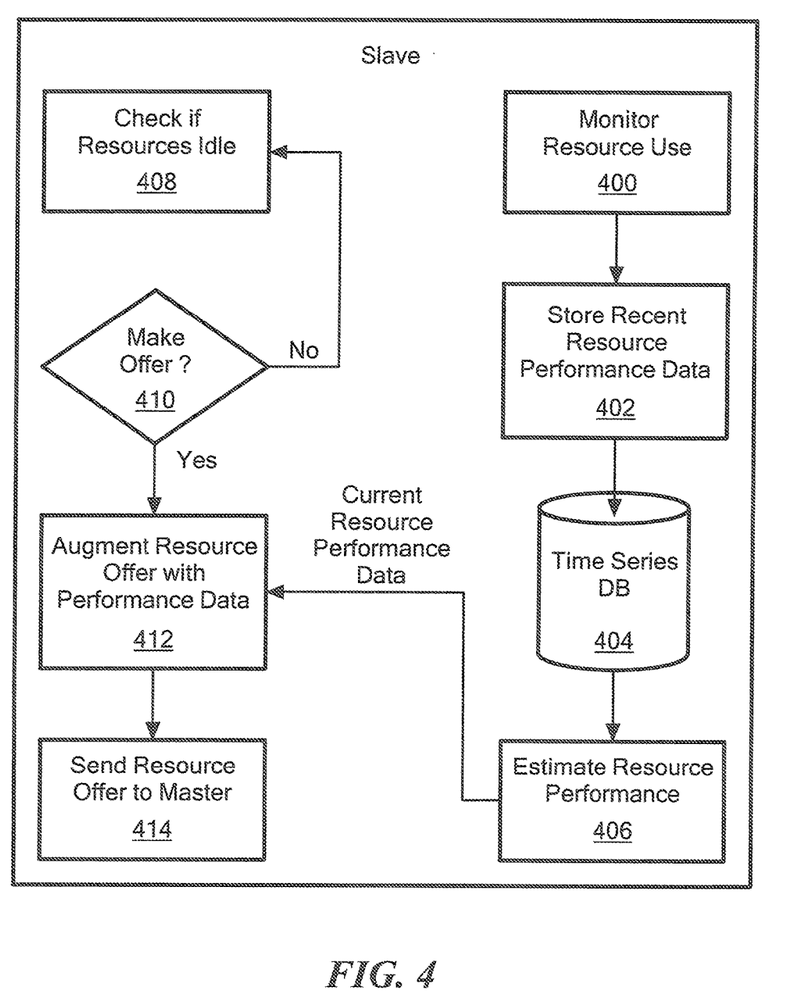
FIG. 4 is a flow diagram showing an illustrative sequence of steps for providing resource quality estimation in a resource sharing platform in accordance with illustrative embodiments of the disclosure.

In other embodiments, resource offers are augmented to include resource quality information. In FIG. 4, for example, a slave sends the augmented resource offer to the master, and in FIG. 5, for example, the master augments a resource offer with the performance data, as described more fully below.

FIG. 4 shows an illustrative sequence of steps to provide resource quality estimation in a resource sharing platform in accordance with illustrative embodiments of the invention. In step 400, a slave in a cluster monitors resource use for slaves in the cluster, and in step 402, stores the recent resource performance data in a time series database 404. In step 406, the resource performance is estimated and used in step 412 to augment a resource offer with the resource performance data. In step 414, the slave sends the augmented resource offer to the master. The framework can use the augmented data to evaluate equivalent offers. It is understood that in step 408, it can be determined if slave resource are idle/available, and in step 410, it can be determined whether a resource offer should be made.

Figure 5:
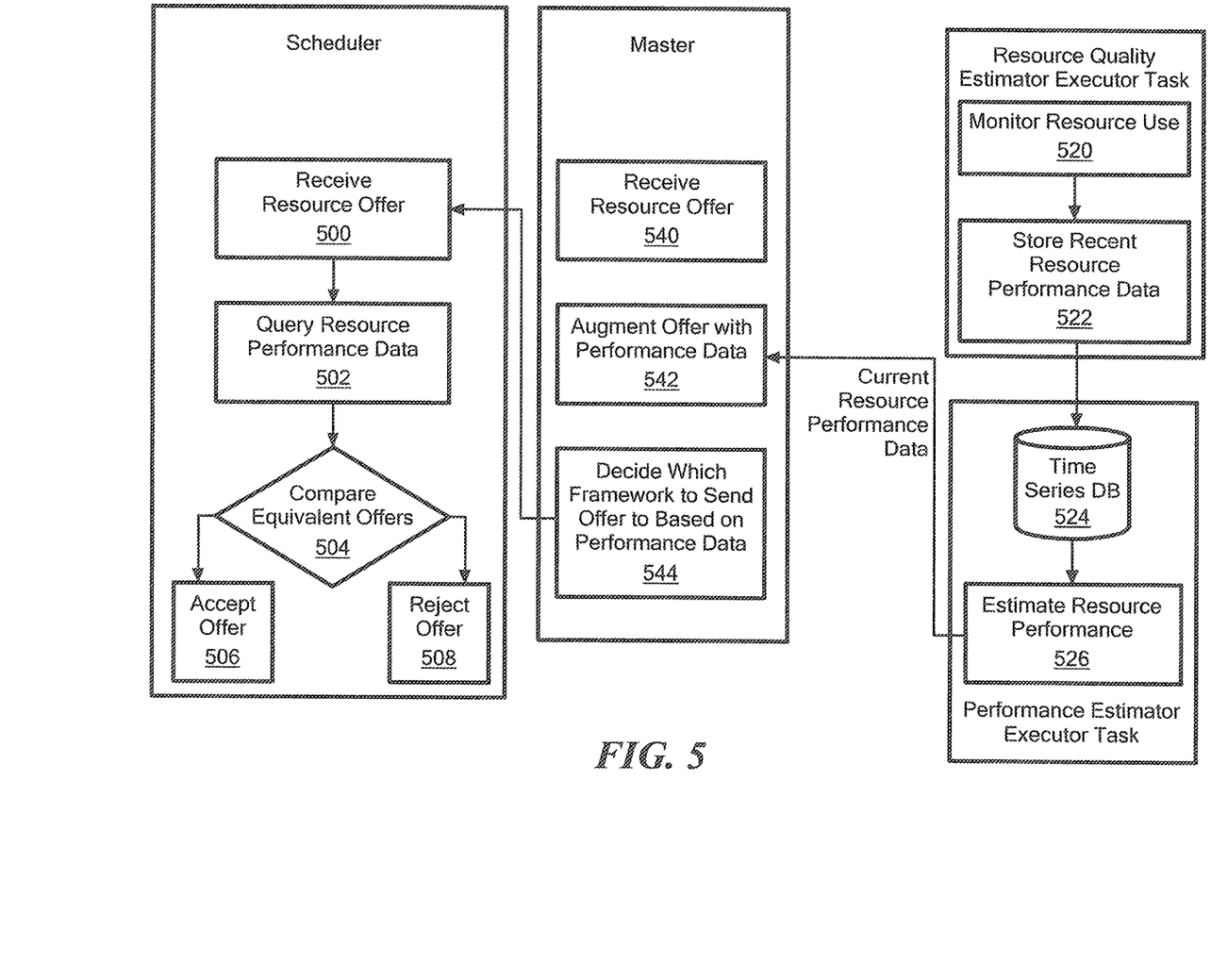
FIG. 5 is a flow diagram showing an alternative illustrative sequence of steps for providing resource quality estimation in a resource sharing platform in accordance with illustrative embodiments of the disclosure.

In another embodiment shown in FIG. 5, the master directly queries the performance estimator application 304 (FIG. 3). For each offer the master 312 receives from any slave, the master can augment the offer with performance data retrieved from the performance estimator application 304 and then make a (potentially different) decision as to which framework to send the offer influenced by the performance information. In this embodiment, there is no direct coupling between the application and the performance estimator application 304.

FIG. 5 shows an illustrative sequence of steps to provide resource quality estimation in a resource sharing platform in accordance with illustrative embodiments of the invention. In step 500, a scheduler for a resource quality estimator framework receives a resource offer from a master. In step 502, the scheduler queries resource performance data for one or more slaves, which can be stored in a time series database. In step 504, the scheduler in the framework compares offers, which can appear equivalent, from the slaves in the cluster. In response to the offers, the scheduler accepts 506 one of the offers and rejects 508 the other offers.

In step 520, the resource quality estimator executor task monitors resource use on the slaves, and in step 522, stores recent resource performance data in a time series database 524. In step 526, a performance estimator executor task estimates resource performance. After the master receives a resource offer in step 540, the master augments the offer with the performance data in step 542 using the estimated resource performance data from the performance estimator task. In step 544, the master determines the framework to which the offer should be sent based on the performance data.

As used herein, a resource sharing platform may refer to a distributed computing program wherein the resources aggregated within a cluster of computers is made available to one or more applications. While illustrative embodiments of the invention are shown and described in conjunction with storage systems, it is understood that embodiments of the invention are applicable to computer systems in general having resource sharing in which resource quality estimation is desirable. In illustrative embodiments, resource quality estimation is provided as part of an APACHE MESOS resource sharing platform.

Figure 6:
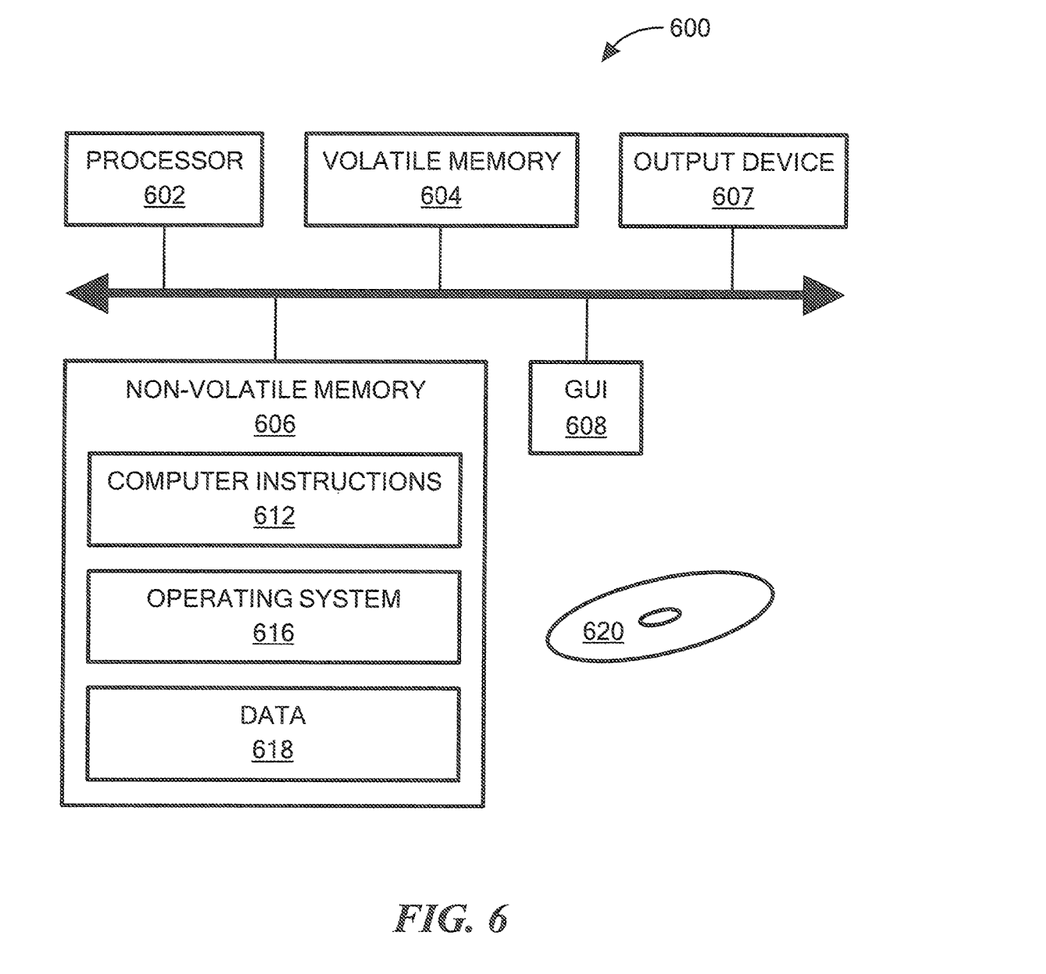
FIG. 6 is a schematic diagram of an illustrative computer that can perform at least a portion of the processing described herein.

FIG. 6 shows an exemplary computer 600 that can perform at least part of the processing described herein. The computer 600 includes a processor 602, a volatile memory 604, a non-volatile memory 606 (e.g., hard disk), an output device 607 and a graphical user interface (GUI) 608 (e.g., a mouse, a keyboard, a display, for example). The non-volatile memory 606 stores computer instructions 612, an operating system 616 and data 618. In one example, the computer instructions 612 are executed by the processor 602 out of volatile memory 604. In one embodiment, an article 620 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
   storing resource performance data for resources provided by slaves in a resource sharing platform having a master and the slaves, wherein the resources include CPU time and free memory;
   estimating resource performance according to the stored performance data;
   sending, by said master, a first resource offer and a second resource offer to a framework communicatively coupled to the master and the slaves;
   evaluating the first and second resource offers, wherein the first and second resource offers include a substantially equivalent amount of available resources on a first and second slave and wherein the substantially equivalent amount of available resources differ in resource quality;
   allocating, by the master, the resources on the first and second slaves;
   assigning, by the first and second slaves, tasks for the resources on the first and second slaves, wherein the tasks include a performance estimator task on the first slave and a performance estimator application on the second slave;
   estimating a resource quality of each of the first and second slave by executing the respective tasks;
   recording and storing the estimated resource quality of each of the first and second slaves in a time series database;
   selecting between the first resource offer and the second resource offer, using the time series database, according to estimated resource performance information, wherein the estimated resource information comprises the estimated resource performance and estimated resource quality; and
   prior to sending the first and second resource offers to the framework, augmenting, by the master, the first and second offers with the estimated resource performance information and, by the master, selecting the framework from a plurality of frameworks based on the estimated resource performance information.

2. The method according to claim 1, further including enabling a further framework access to the performance estimator application.

3. An article, comprising:
   a non-transitory computer readable medium having stored instructions that enable a machine to:
   store resource performance data for resources provided by slaves in a resource sharing platform having a master and the slaves, wherein the resources include CPU time and free memory;
   estimate resource performance according to the stored performance data;
   sending, by said master, a first resource offer and a second resource offer to a framework communicatively coupled to the master and the slaves;
   evaluating the first and second resource offers, wherein the first and second resource offers include a substantially equivalent amount of available resources on a first and second slave and wherein the substantially equivalent amount of available resources differ in resource quality;
   allocating, by the master, the resources on the first and second slaves;
   assigning, by the first and second slaves, tasks for the resources on the first and second slaves, wherein the tasks include a performance estimator task on the first slave and a performance estimator application on the second slave;
   estimating a resource quality of each of the first and second slave by executing the respective tasks;
   recording and storing the estimated resource quality of each of the first and second slaves in a time series database;
   selecting between the first resource offer and the second resource offer, using the time series database, according to estimated resource performance information, wherein the estimated resource information comprises the estimated resource performance and estimated resource quality; and
   prior to sending the first and second resource offers to the framework, augmenting, by the master, the first and second offers with the estimated resource performance information and, by the master, selecting the framework from a plurality of frameworks based on the estimated resource performance information.

4. The article according to claim 3, further including enabling a further framework access to the performance estimator application.

5. A resource sharing system, comprising:
   processors and memory configured to enable:
   storing resource performance data for resources provided by slaves in a resource sharing platform having a master and the slaves, wherein the resources include CPU time and free memory;
   estimating resource performance according to the stored performance data;
   sending, by said master, a first resource offer and a second resource offer to a framework communicatively coupled to the master and the slaves;
   evaluating the first and second resource offers, wherein the first and second resource offers include a substantially equivalent amount of available resources on a first and second slave and wherein the substantially equivalent amount of available resources differ in resource quality;
   allocating, by the master, the resources on the first and second slaves;
   assigning, by the first and second slaves, tasks for the resources on the first and second slaves, wherein the tasks include a performance estimator task on the first slave and a performance estimator application on the second slave;
   estimating a resource quality of each of the first and second slave by executing the respective tasks;
   recording and storing the estimated resource quality of each of the first and second slaves in a time series database;

selecting between the first resource offer and the second resource offer, using the time series database, according to estimated resource performance information, wherein the estimated resource information comprises the estimated resource performance and estimated resource quality; and prior to sending the first and second resource offers to the framework, augmenting, by the master, the first and second offers with the estimated resource performance information and, by the master, selecting the framework from a plurality of frameworks based on the estimated resource performance information.

* * * * *